United States Patent
Dooling et al.

(10) Patent No.: US 10,214,153 B2
(45) Date of Patent: Feb. 26, 2019

(54) OUTDOOR STORAGE BAG

(71) Applicants: Daniel J. Dooling, Fenton, MI (US); Julie A. Dooling, Fenton, MI (US)

(72) Inventors: Daniel J. Dooling, Fenton, MI (US); Julie A. Dooling, Fenton, MI (US)

(73) Assignee: Load Lugger, LLC, Fenton, MI (US)

( * ) Notice: Subject to any disclaimer, the term of this patent is extended or adjusted under 35 U.S.C. 154(b) by 0 days.

(21) Appl. No.: 15/152,539

(22) Filed: May 11, 2016

(65) Prior Publication Data

US 2016/0362065 A1 Dec. 15, 2016

Related U.S. Application Data

(60) Provisional application No. 62/159,492, filed on May 11, 2015.

(51) Int. Cl.
| | |
|---|---|
| *B60R 9/06* | (2006.01) |
| *B60P 7/08* | (2006.01) |
| *B65D 33/25* | (2006.01) |
| *B65D 30/08* | (2006.01) |

(52) U.S. Cl.
CPC .......... *B60R 9/065* (2013.01); *B60P 7/0876* (2013.01); *B65D 29/02* (2013.01); *B65D 33/2591* (2013.01)

(58) Field of Classification Search
CPC ... B60R 9/065; B60R 13/01; B60R 2013/016; B60R 5/045; B60R 9/055; B60P 7/0876; B65D 29/02; B65D 33/2591; A45C 13/002; A45C 13/008; A45C 13/103; B63C 2009/042

USPC ............................................ 224/404; 383/21
See application file for complete search history.

(56) References Cited

U.S. PATENT DOCUMENTS

| | | | | |
|---|---|---|---|---|
| 4,718,583 A | * | 1/1988 | Mullican ................... | B60R 9/00 206/527 |
| 4,877,281 A | * | 10/1989 | Altmann ................. | B60R 13/01 220/495.01 |
| 4,951,818 A | * | 8/1990 | Johnson ................. | A45C 13/36 190/107 |
| 5,328,268 A | * | 7/1994 | Lafleur ............. | B65D 88/1631 220/652 |
| 5,378,034 A | * | 1/1995 | Nelsen ..................... | B60J 7/102 220/666 |

(Continued)

*Primary Examiner* — Nathan J Newhouse
*Assistant Examiner* — Matthew T Theis
(74) *Attorney, Agent, or Firm* — North Star IP Law PLLC; Edmund P. Anderson

(57) ABSTRACT

A selectively openable and closable, outdoor storage bag includes a body portion made of a flexible, waterproof, plastic coated fabric bag material, the bag material comprising a plurality of waterproof welded seams that define a predetermined shape of the body portion and an opening, the body portion defining an interior space within the body portion; a closure mechanism joined to the body portion by a welded seam proximate a periphery of the opening, the closure mechanism configured to selectively open and close the opening and provide a seal that is at least water-resistant when the opening is closed; a flap of the plastic coated fabric bag material that extends from the body portion and covers the closure mechanism; and a plurality of anchor points attached to an exterior surface of the body portion, wherein the body portion of the bag is waterproof and the seal is at least water-resistant.

20 Claims, 14 Drawing Sheets

(56) References Cited

U.S. PATENT DOCUMENTS

| | | | | |
|---|---|---|---|---|
| 5,444,898 A | * | 8/1995 | Norvell | A41D 3/00 24/389 |
| 5,456,426 A | * | 10/1995 | Wexler | B64B 1/66 244/127 |
| 5,695,286 A | * | 12/1997 | Williamson | B65D 88/1612 383/16 |
| 6,129,501 A | | 10/2000 | Haddad | |
| 6,257,470 B1 | * | 7/2001 | Schaefer | B60R 9/055 224/318 |
| 6,582,124 B2 | * | 6/2003 | Mogil | A45C 7/0077 383/110 |
| 6,892,912 B1 | * | 5/2005 | MacNeil | B60R 9/055 224/318 |
| 8,562,214 B2 | | 10/2013 | Dozier et al. | |
| 9,169,061 B2 | | 10/2015 | Blanchard et al. | |
| 2011/0129169 A1 | * | 6/2011 | Dozier | A45C 13/002 383/105 |

\* cited by examiner

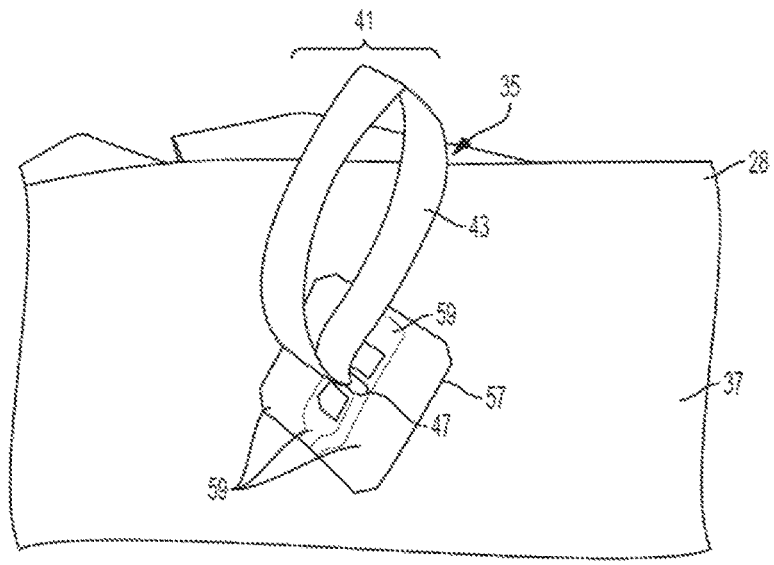

FIG. 11

Table 1

| PHYSICAL PROPERTIES | | | | | | | | | | | |
|---|---|---|---|---|---|---|---|---|---|---|---|
| ROLL DIMENSIONS | | 10 OZ | | 14 OZ | | 18 OZ | | 22 OZ | | 40 OZ | |
| | | VALUE | ASTM STD | VALUE | ASTM STD | VALUE | ASTM STD | VALUE | ASTM STD | VALUE | ASTM STD |
| Tensile Strength (lbs/in$^2$) | WARP | 495 | D5035 | 420 | D5035 | 480 | D5035 | 640 | D5035 | 460 | D751 |
| | WEFT | 450 | | 375 | | 500 | | 585 | | 415 | |
| Tear Strength (lbs) | WARP | 60 | D2261 | 50 | D2261 | 90 | D2261 | 100 | D2261 | 120 | D751 |
| | WEFT | 55 | | 40 | | 70 | | 85 | | 108 | |
| Adhesion Strength (lbs/in$^2$) | | 15 | D2724 | 20 | D2724 | 18 | D2724 | 17.5 | D2724 | 14 | D751 |
| TEMPERATURE RESISTANCE (°F) | | -20° – 150° | | -20° – 150° | | -20° – 150° | | -20° – 150° | | -20° – 150° | |
| UV | | FOR EXTERIOR APPLICATIONS | | FOR EXTERIOR APPLICATIONS | | FOR EXTERIOR APPLICATIONS | | FOR EXTERIOR APPLICATIONS | | FOR EXTERIOR APPLICATIONS | |

FIG. 12

Table 2

| MATERIAL DESCRIPTION | | | | | |
|---|---|---|---|---|---|
| MATERIAL | 10 OZ | 14 OZ | 18 OZ | 22 OZ | 40 OZ |
| MATERIAL WEIGHT (OZ/YD$^2$) | 10 | 14 | 18 | 22 | 40 |
| ROLL WIDTH (IN) | 61 | 61 | 61 | 61 | 61 |
| ROLL LENGTH (YD) | 100 | 100 | 100 | 100 | 100 |
| NET WEIGHT (LBS) | 106 | 148 | 196 | 233 | 212 |
| BASE FABRIC FIBER | Woven Polyester | Woven Polyester | Woven Polyester | Woven Polyester | Woven Polyester |
| YARN (DENIER) | 1000 x 1000 | 1000 x 1000 | 1000 x 1300 | 1300 x 1300 | 1300 x 1300 |
| FABRIC COUNT (THREADS/SQ IN) | 20 x 20 | 16 x 16 | 18 x 17 | 18 x 17 | 30 x 30 |
| TYPE OF COATING | PVC | PVC | PVC | PVC | PVC |

FIG. 13

OUTDOOR STORAGE BAG

BACKGROUND OF INVENTION

1. Field of Invention

The invention relates to, generally, an apparatus, a product, or a system configured to manage a payload (i.e., a load of articles, cargo, contents, or goods) and, more particularly, an outdoor storage bag or an enclosure configured to store, mobilize, and protect the payload and be easily removably (i.e., non-permanently) anchored to an object, such as a fixed outdoor location or a vehicle, in open and closed positions of the bag, and more particularly to an outdoor storage bag or an enclosure configured to be easily removably anchored in a bed of a pick-up truck.

2. Description of Related Art

A bed of a light- or heavy-duty pick-up truck is a storage area in a rear of the truck for payload (i.e., a load of articles, cargo, contents, or goods). The truck bed and payload are essentially out in the open and inherently exposed and open to outside elements of weather (including, but not limited to, cold, hail, heat, humidity, rain, sleet, snow, sun, and wind), dirt, and sand that can damage the payload. As such, to transport the payload in the truck bed, the payload must be able to withstand the elements, sand, and dirt and be protected therefrom and the resultant damage during transit and over long distances of the truck. Additionally, having the truck bed so exposed leaves the payload more susceptible to theft because the payload is unprotected and in plain sight. Furthermore, as the truck bed has no top or roof and, thus, is not confined by a fixed height limitation, vast flexibility is allowed in what may be stored or mobilized by the truck. Yet, proper confinement of the truck bed for smaller payloads is also prevented.

Known attempted solutions—such as Tonneau covers, camper tops, and the like—have been employed to address this issue. However, these solutions and installation thereof can hinder long-term flexibility of the truck bed and are complicated, cumbersome, expensive (i.e., add significant expense), and substantially permanent, thus limiting utility of the truck in large part. Other known attempted solutions—such as truck boxes—are also semi-permanent, heavy, and intrude significantly into space for the payload.

Another known attempted solution is a large, waterproof bag that is sized to fit into the truck bed. More specifically, the bag is rectangular or square and sealed by an elongated zipper at one end of the bag. An overlapping flap at an opening at one end of the bag is configured to cover and protect the zipper from the elements. The bag is used to store the payload (for example, luggage) in a waterproof environment in the truck bed. The bag features a series of anchoring assemblies (i.e., eight hook assemblies or anchor loops) located and attached (i.e., sewn to a backing flap, adhesively secured, and heat-sealed) at each of four corners of two opposed sides or surfaces of the bag. The anchoring assemblies can be used to anchor or secure the bag in place in either a horizontal or vertical orientation or position during travel of the truck. In particular, the backing flap is adhered and heat-sealed to a larger anchoring patch, thereby forming a unit adhered to and heat-sealed to a surface of the bag to form an anchoring assembly.

In operation of the bag, the bag is mounted in either the horizontal or vertical orientation and anchored by the four anchoring assemblies. The anchoring assemblies are located on an upper surface of the bag when the bag is positioned in the horizontal orientation. When the bag is positioned in the vertical orientation, two of the anchoring assemblies located on the two opposed sides of the bag at an upper portion of the bag are used to secure the bag in place. A series of four rope or bungee cords are used to secure the bag to opposed side rails of the truck bed in either the horizontal or vertical orientation.

Another known attempted solution is a payload-storage enclosure for a truck that includes a substantially rectangular first section of tear-resistant material. The first section has at least two folds to create a "U" shape, a top edge along a perimeter, a bottom edge, and two side edges of the first section. A substantially rectangular second section of tear-resistant material has at least two folds to create a "U" shape and forms top, bottom, and back panels. The second section is operatively affixed to the first section by attaching the bottom edge of the first section to the bottom panel of the second section along a perimeter of the bottom panel. The side edges of the first section are attached to the back panel of the second section along a perimeter of the back panel. A closure mechanism includes a first mating surface along the top edge of the first section and a second mating surface along a perimeter of the top panel of the second section. The first and second mating surfaces can be detachably connected from each other to form a substantially rectangular prism having a plurality of corners.

However, neither the known bag nor enclosure includes a source of electrical power. Neither the known bag nor enclosure includes also sufficient anchoring and holding strength. The known bag and/or enclosure includes metal that can rust, scratch, or damage the truck bed or paint thereof. The known bag and/or enclosure includes also gluing, sewing, or stitching. Neither the known bag nor enclosure also is low-temperature- and high-temperature-resistant (i.e., has high "freeze/crack" "melt" ratings). Neither the known bag nor enclosure is also highly ultraviolet (UV)-resistant (i.e., no fading of the bag or enclosure after prolonged exposure thereof to UV radiation). Neither the known bag nor enclosure includes also a closure mechanism, such as a zipper assembly, that is waterproof (i.e., has water-tight redundancy) and a position of zippers of which allows for full access to the bag or enclosure. Neither the known bag nor enclosure includes also protection (i.e., reduction of wear of) a bottom of the bag or enclosure.

Thus, there is a need in the related art for an outdoor payload-storage bag (or enclosure). More specifically, there is a need in the related art for such a bag that is immune to elements of weather and configured to be securely anchored to an object or a vehicle, such as in a truck bed, in open and closed positions of the bag. There is a need in the related art for such a bag that also is sufficiently durable or sturdy to protect payload from and withstand the elements, particularly water, and is easy to set-up in and removed from the object or vehicle, including a truck bed. There is a need in the related art for such a bag that also is light for easy long- and short-term storage, mobilization, and transport of the payload. There is a need in the related art for such a bag that also is cost-effective. There is a need in the related art for such a bag that also is simple, efficient, and cost-effective. There is a need in the related art for such a bag that also conceals or shields the payload from view. There is a need in the related art for anchor points, such as bag straps of which can be quickly connected and disconnected.

There is a need in the related art for such a bag that also includes a source of electrical power. There is a need in the related art for such a bag that includes also sufficient anchoring and holding strength. There is a need in the related art for such a bag that also does not include metal that can rust, scratch, or damage the truck bed or paint thereof. There is a need in the related art for such a bag that does not include gluing, sewing, or stitching. There is a need in the related art for such a bag that is also low-temperature- and high-temperature-resistant (i.e., has high "freeze/crack" "melt" ratings). There is a need in the related art for such a bag that is also highly ultraviolet (UV)-resistant (i.e., no fading of the bag after prolonged exposure thereof to UV radiation). There is a need in the related art for such a bag that includes also a closure mechanism that is at least water resistant or waterproof (i.e., has water-tight redundancy) and a position of which allows for full access to the bag. There is a need in the related art for such a bag that includes also protection (i.e., reduction of wear of) a bottom of the bag.

SUMMARY OF INVENTION

The invention overcomes the aforesaid disadvantages in the related art and provides an outdoor storage bag configured to store, mobilize, and protect payload and be easily removably anchored to an object, such as a fixed outdoor location or a vehicle, including in a bed of a pick-up truck, in open and closed positions of the bag.

In one embodiment, a selectively openable and closable, outdoor storage bag that is at least water-resistant is disclosed. The outdoor storage bag includes a body portion made of a flexible, waterproof, plastic coated fabric bag material, the bag material comprising a plurality of waterproof welded seams that define a predetermined shape of the body portion and an opening, the body portion defining an interior space within the body portion, the predetermined shape and interior space configured to receive, enclose, and store a predetermined cargo. The outdoor storage bag also includes a closure mechanism joined to the body portion by a welded seam proximate a periphery of the opening, the closure mechanism configured to selectively open and close the opening and provide a seal that is at least water-resistant when the opening is closed. The outdoor storage bag also includes a flap of the plastic coated fabric bag material that extends from the body portion and covers the closure mechanism. The outdoor storage bag also includes a plurality of anchor points attached to an exterior surface of the body portion, wherein the body portion of the bag is waterproof and the seal is at least water-resistant.

The invention overcomes the disadvantages in related art truck-bed bags.

In a non-limiting exemplary embodiment of the outdoor storage bag according to the invention, the bag includes at least one solar panel.

In a non-limiting exemplary embodiment of the outdoor storage bag, the bag includes four anchoring components each of which is made of three-ply PVC or Kevlar® mesh, each ply being heat-welded [i.e., ultrasonic/radio-frequency (RF) welded] to the bag and having about a 300-pound holding strength.

In a non-limiting exemplary embodiment of the outdoor storage bag, the bag also may include a plurality of straps to anchor the bag to original-equipment-manufacturer anchor points (OEM anchor points) in a vehicle, such as a truck bed.

In a non-limiting exemplary embodiment of the outdoor storage bag, the bag includes a load-tightening strap anchored by three-ply PVC coated polyester fabric, each ply being heat-welded [i.e., ultrasonic/radio-frequency (RF) welded] to the bag and having about a 300-pound holding strength.

In a non-limiting exemplary embodiment of the outdoor storage bag, the bag does not include metal that can rust, scratch, or damage the truck bed or paint thereof.

In a non-limiting exemplary embodiment of the outdoor storage bag, the bag does not include gluing, sewing, or stitching.

In a non-limiting exemplary embodiment of the outdoor storage bag, the bag is low-temperature- and high-temperature-resistant (i.e., has a "freeze/crack" rating of about −40° F. and a "melt" rating of up to about 150° F.).

In a non-limiting exemplary embodiment of the outdoor storage bag, the bag is highly ultraviolet (UV)-resistant (i.e., no fading of the bag after prolonged exposure thereof to UV radiation).

In a non-limiting exemplary embodiment of the outdoor storage bag, the bag includes a closure mechanism in the form of a zipper assembly that is at least water resistant, and in one embodiment waterproof (i.e., watertight), and a has a position of the zipper or zippers which allows for full access to the bag.

In a non-limiting exemplary embodiment of the outdoor storage bag, the bag includes also an integrated skid plate for protecting (i.e., reducing wear of) a bottom of the bag.

An advantage of the outdoor storage bag according to the invention is that provides protection of payload from weather elements, including, water, dust, dirt, sand, smoke, soot, salt spray or other elements, and physical damage, as well as ease of use and manufacture of the bag.

Another advantage of the outdoor storage bag according to the invention is that it is highly water-resistant, and in certain embodiments waterproof.

Another advantage of the outdoor storage bag according to the invention is that it can be customized to satisfy individual application and branding requirements, including providing any required bag color and/or combination of colors, as well as the incorporation of brand trademarks, such as various names, symbols, logos, and combinations thereof.

Another advantage of the outdoor storage bag according to the invention is that it is heavy-duty, including being resistant to external surface physical damage from external objects and internal surface physical damage from payload articles in use, including resistance to abrasion, scuffing, marring, ripping, tearing, puncture and the like.

Another advantage of the outdoor storage bag according to the invention is that the external surface comprises a matte finish plastic coated fabric, such as a matte-embossed PVC coated polyester fabric.

Another advantage of the outdoor storage bag according to the invention is that it may be made in a range of material weights that are well-suited to wide variety of different bag applications, including a range of 10 ounce per square yard to 40 ounce per square yard PVC coated polyester fabrics.

Another advantage of the outdoor storage bag according to the invention is that it has a high tensile and adhesion strength.

Another advantage of the outdoor storage bag according to the invention is that it includes seams that are strong and heat-welded [i.e., ultrasonic/radio-frequency (RF) welded].

Another advantage of the outdoor storage bag according to the invention is that it is highly abrasion- and rot-resistant.

Another advantage of the outdoor storage bag according to the invention is that it is highly tear- and puncture-resistant.

Another advantage of the outdoor storage bag according to the invention is that it has a high thread count (i.e., about 1000×1300).

Another advantage of the outdoor storage bag according to the invention is that it is highly hydrostatic-resistant.

Another advantage of the outdoor storage bag according to the invention is that it is flame-resistant.

Another advantage of the outdoor storage bag according to the invention is that it includes a one-step emergency patch kit that can be quickly applied.

Another advantage of the outdoor storage bag according to the invention is that it is light and flexible and can take on a wide range of sizes (from small to large) of a payload bundle.

Those having ordinary skill in the related art should readily appreciate objects, features, and other advantages of the according to the invention as it becomes more understood while the subsequent detailed description of non-limiting exemplary embodiments of the assembly is read taken in conjunction with an accompanying drawing thereof.

BRIEF DESCRIPTION OF THE DRAWINGS

FIG. 11 is a perspective view of an attachment point for an outdoor storage bag, as described herein;

FIG. 12 is Table 1, as described herein;

FIG. 13 is Table 2, as described herein;

DETAILED DESCRIPTION OF EMBODIMENTS OF INVENTION

Figure 1:
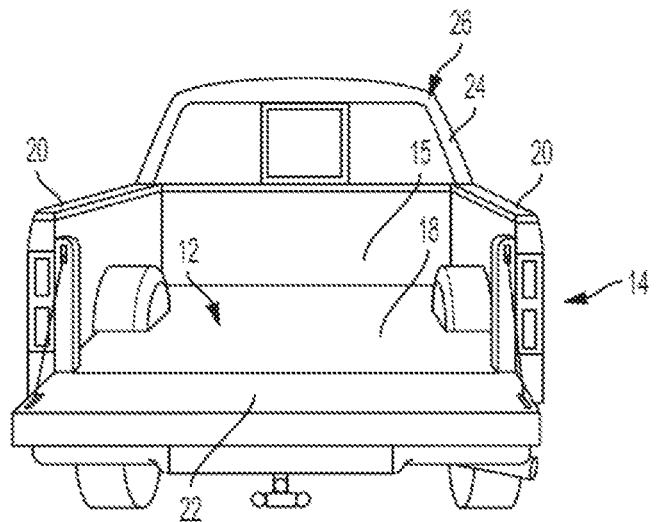
FIG. 1 is a perspective view of a pick-up truck showing a bed thereof with which an non-limiting exemplary embodiment of the outdoor storage bag according to the invention is configured to be installed and attached.
Figure 2:
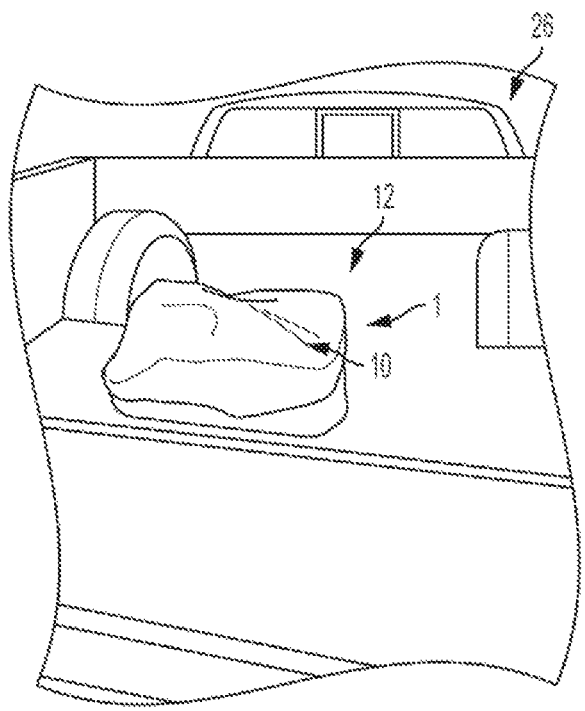
FIG. 2 is a perspective view of the embodiment of the outdoor storage bag of FIG. 1 showing the bag supported in a completely contracted and closed state on a floor of the truck bed illustrated in FIG. 1, without a payload.
Figure 3:
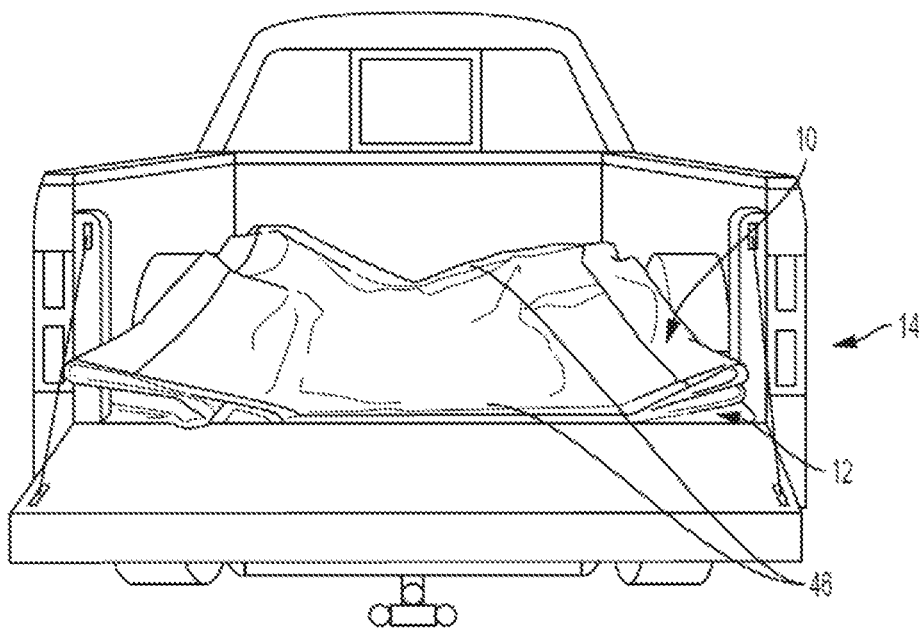
FIG. 3 is a perspective view of the embodiment of the outdoor storage bag illustrated in FIGS. 1 and 2 showing the bag supported in a partially expanded and open state within the truck bed without a payload.
Figure 4A:
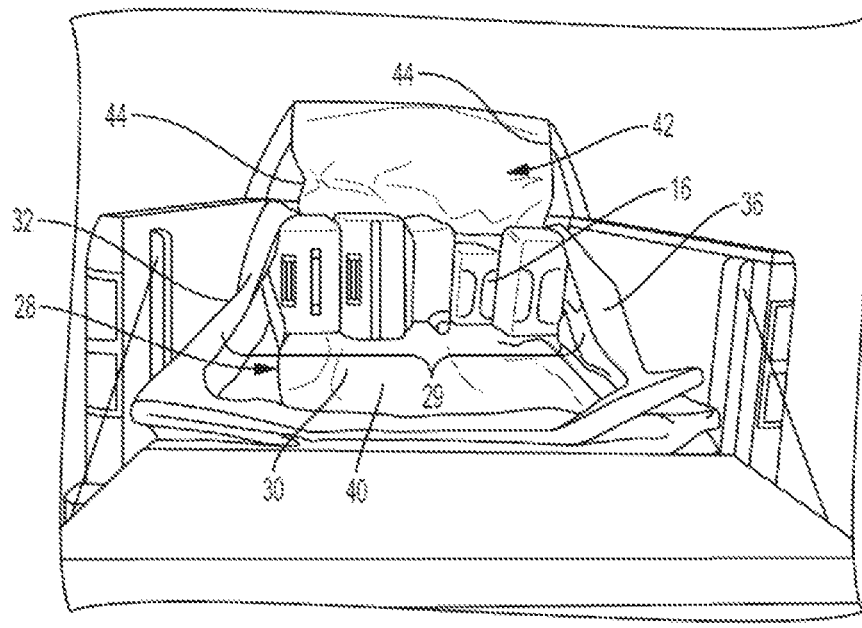
FIGS. 4A-4C are perspective views of the embodiment of the outdoor storage bag illustrated in FIGS. 1-3 showing the bag supported in a completely expanded and open state within the truck bed with a payload.
Figure 4B:
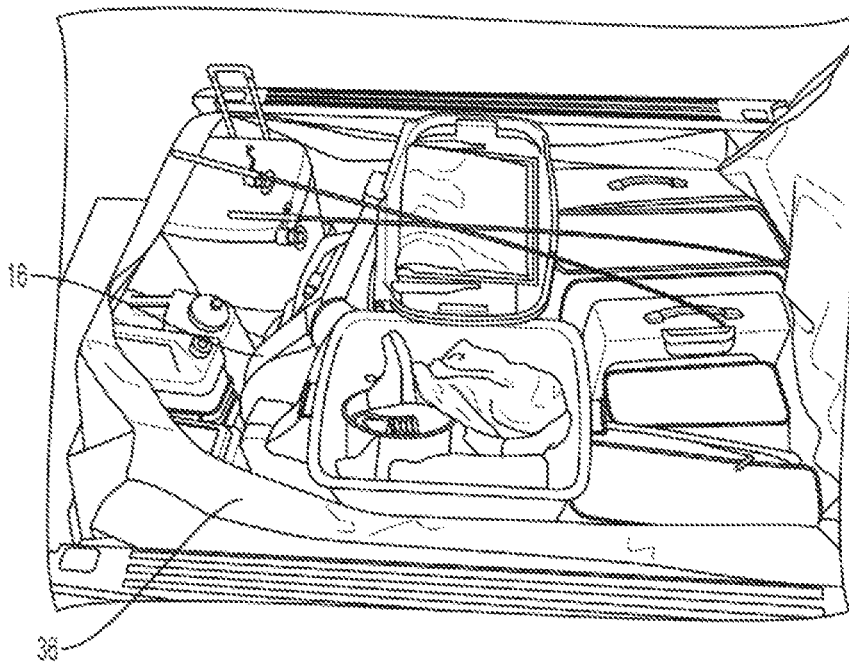
Figure 4C:
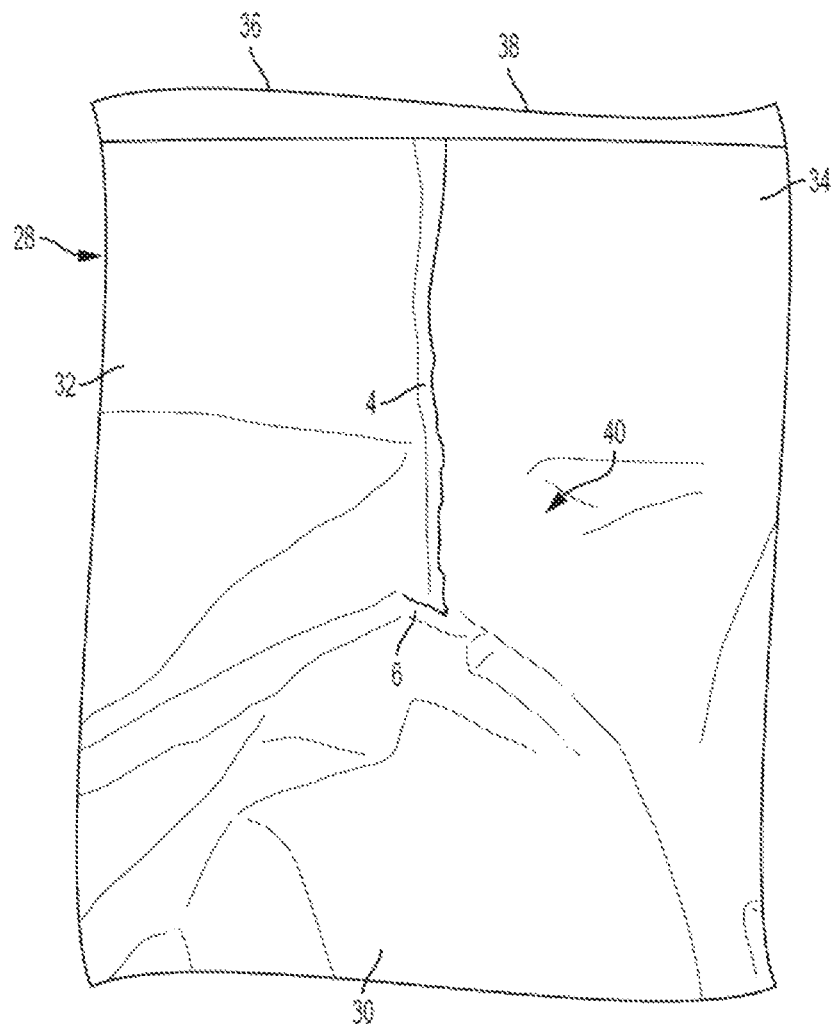
Figure 14A:
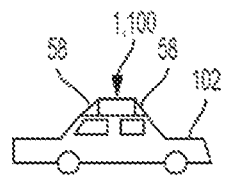
FIGS. 14A-14J are schematic illustrations of various embodiments of the outdoor storage bag, including a cartop bag (FIG. 14A), an SUV bag (FIG. 14B), a trailer bag (FIG. 14C), a bicycle rack bag (FIG. 14D), a motorcycle bag (FIG. 14E), a hitch rack bag (FIG. 14F), a boat bag (FIG. 14 G), a deck or patio bag (FIG. 15 H), a tailgating bag (FIG. 14 I), and a campsite or park bag (FIG. 14J)
Figure 14B:
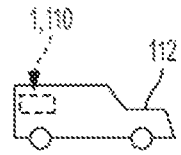
Figure 14C:
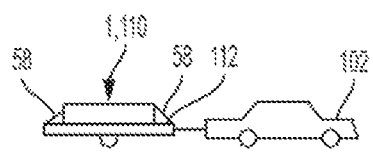
Figure 14D:
Figure 14E:
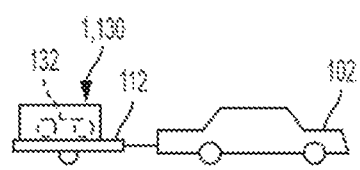
Figure 14F:
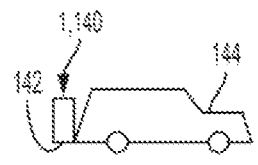
Figure 14G:
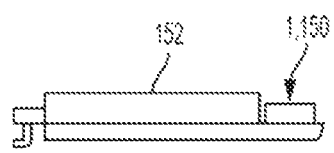
Figure 14H:
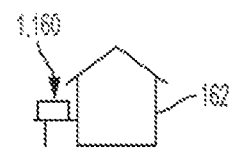
Figure 14I:
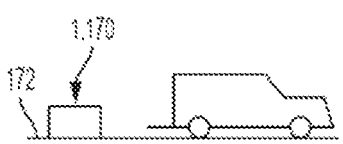
Figure 14J:
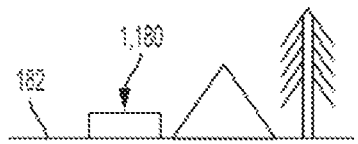

Referring now to the figures, including FIGS. 1-13, throughout which like reference numerals are used to designate like structure, non-limiting exemplary embodiments of an outdoor storage bag 1, and more particularly in this embodiment a truck-bed bag 10, according to the invention, is illustrated. The outdoor storage bag 1 is described below and/or shown in the figures being implemented in a bed, generally indicated at 12, of a light- or heavy-duty pick-up truck, generally indicated at 14. However, the outdoor storage bag 1 can be implemented in any suitable area of any suitable type of truck or other automotive vehicle, in particular, and vehicle or vehicular applications, in general. Without intending to be limited, suitable vehicular applications of outdoor storage bag 1 include a cartop bag 100 configured for attachment to the top of a car 102 (FIG. 14A), a truck bed bag 10 configured for attachment to the bed 12 of a truck 14 (FIGS. 1-5 and 10), a rear compartment bag 110 configured for insertion and/or attachment in a rear compartment of a sport utility vehicle (SUV) 112 or minivan (FIG. 14B), a trailer bag 110 configured for attachment to a towable trailer 112 (FIG. 14C), a bicycle carrier bag 120 configured for attachment to a vehicle bicycle carrier 122 (FIG. 14D), a motorcycle bag 130 configured to enclose a motorcycle 132, particularly for transportation in a towable trailer 112 or truck 14 or storage in a garage or other structure (FIG. 14E), a hitch rack bag 140 for enclosing a payload 16 being transported on a hitch rack 142 of a vehicle 144 (14F), or a marine vehicle or boat bag 150 configured for attachment to a boat 152 or other powered or unpowered (e.g. rowboat, pram, canoe, kayak, paddleboard or the like) marine vehicle (FIG. 14G) applications. It will also be appreciated that the bag 10 can be implemented in any suitable non-vehicular application, including various fixed or transportable emplacement applications. Non-limiting embodiments of fixed emplacement applications include those wherein the outdoor storage bag 1 comprises a deck bag or a patio bag 160 configured for placement on and/or attachment to a deck or patio 162 or other outdoor portion of a building or other structure 164, such as a home or office building (FIG. 14H). Non-limiting embodiments of transportable (i.e. non-fixed) emplacement applications include those wherein the outdoor storage bag 1 comprises a tailgating bag 170 configured for placement and use in a parking lot 172 (FIG. 14I), or a campsite bag 180 configured for placement and use in a campground, park or similar facility 182 (FIG. 14 J). The outdoor storage bag 1 is configured to store, mobilize, and protect a payload, generally indicated at 16 (FIGS. 4A and 4B), and be easily removably anchored in the application environment, including the applications mentioned above, in open (FIG. 4A) and closed (FIG. 5A) positions of the bag 10. It should be so appreciated also that the payload 16 can be any suitable type of predetermined payload 16. It should be so appreciated also that elements of the environment (e.g. weather) from which the bag 10 is configured to protect the payload 16 can be any elements, including water, dust, dirt, sand, smoke, soot, salt spray or other elements.

Figure 6:
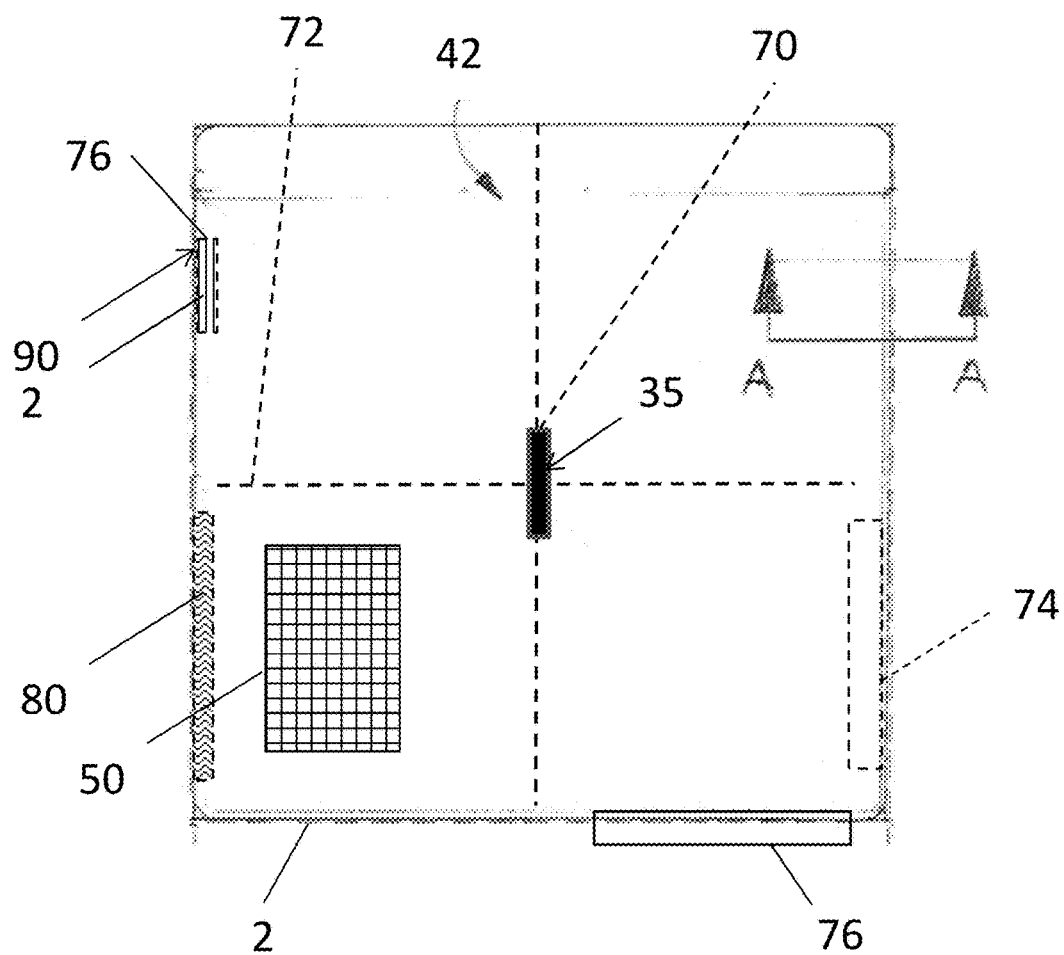
FIG. 6 is a top plan view of an embodiment of the outdoor storage bag, as described herein.
Figure 7:
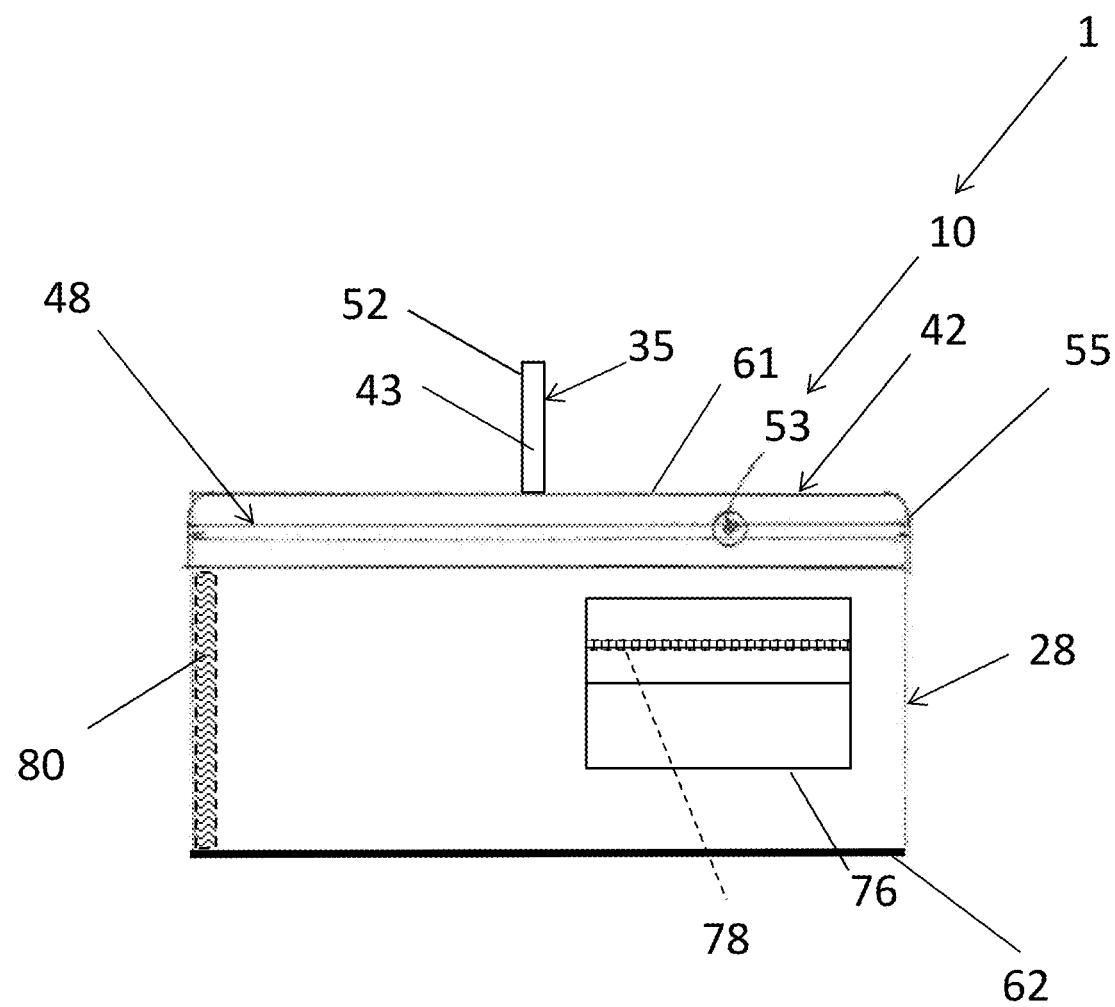
FIG. 7 is a front plan view of the embodiment of the outdoor storage bag of FIG. 6, as described herein.
Figure 8:
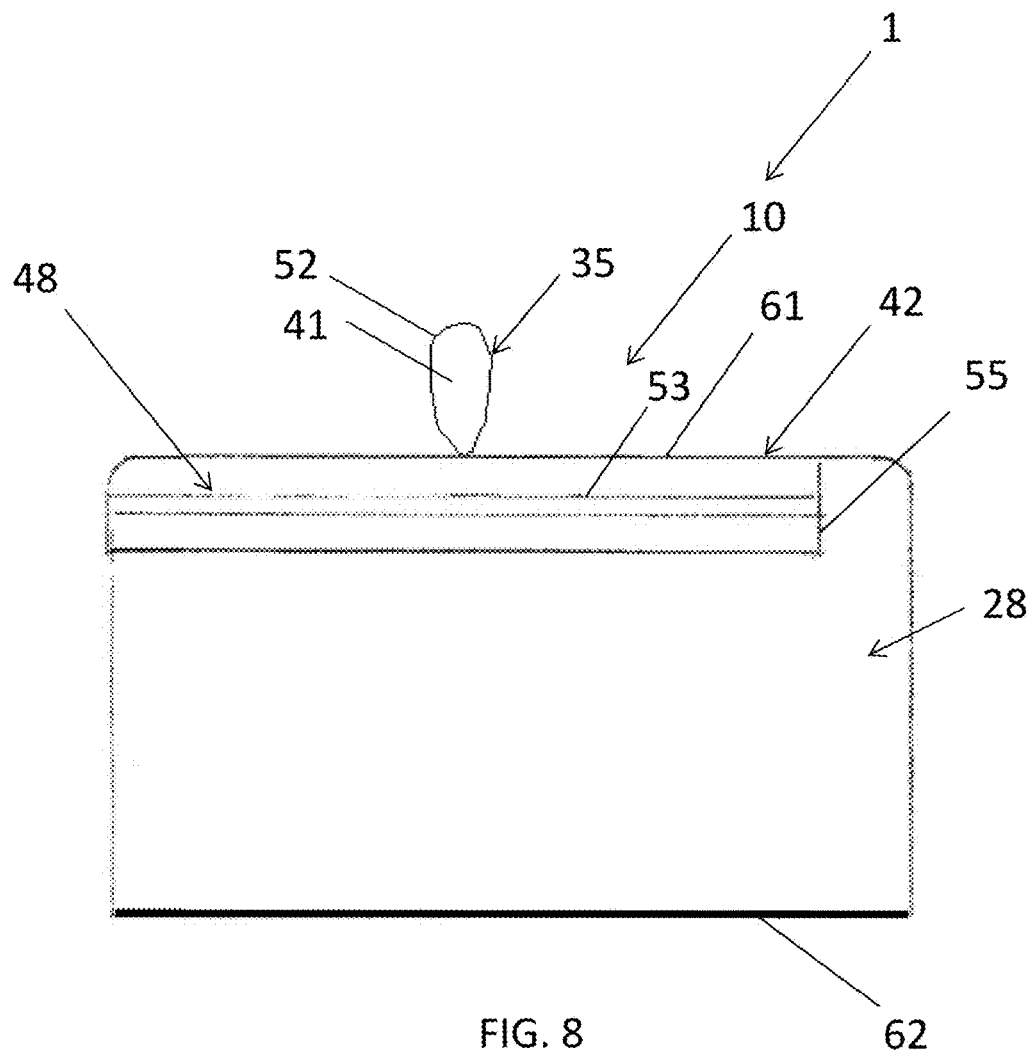
FIG. 8 is a side plan view of the embodiment of the outdoor storage bag of FIG. 6, as described herein.
Figure 9:
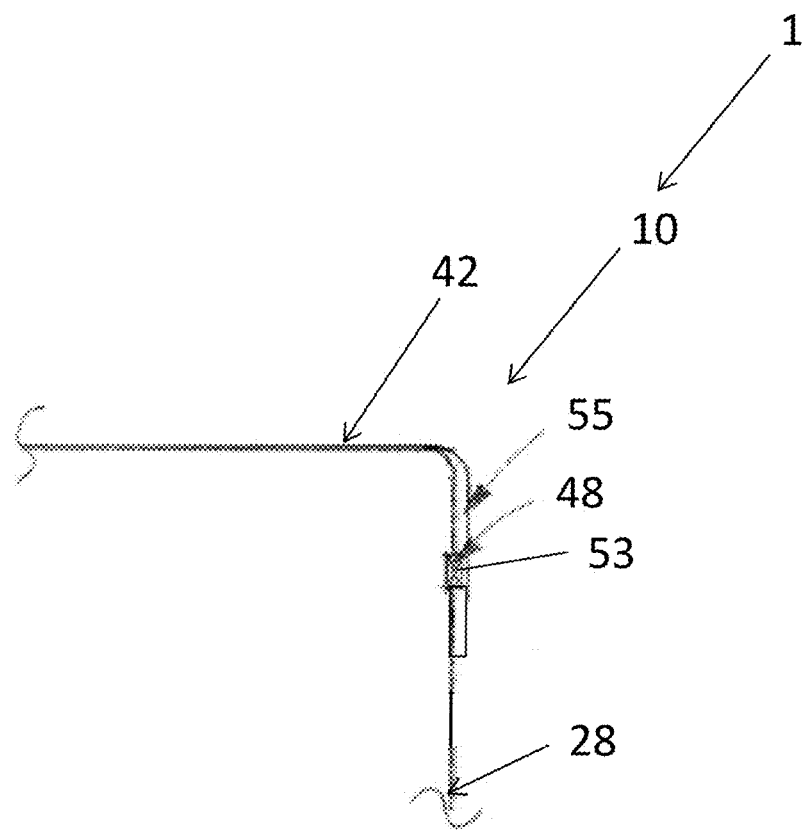
FIG. 9 is an enlarged cross-sectional view of Section A-A of the embodiment of the outdoor storage bag of FIG. 6, as described herein.
Figure 10:
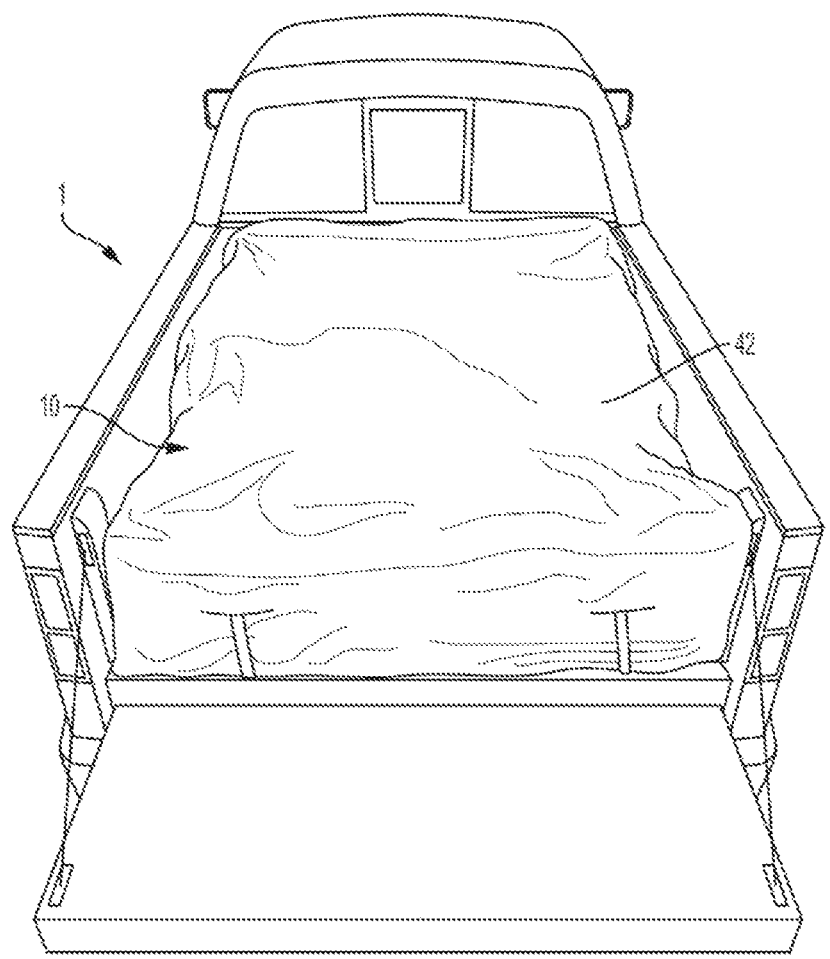
FIG. 10 is a perspective view of an embodiment of the outdoor storage bag, as described herein.

In one exemplary embodiment, a selectively openable and closable, outdoor storage bag 1 is illustrated in FIGS. 6-8. The storage bag 1 is at least water-resistant when closed owing to the nature of its constituent parts and construction, as described below.

In this embodiment, the outdoor storage bag 1 includes a body portion 28 made of a flexible, waterproof, plastic coated fabric bag material 2. Any suitable flexible, waterproof, plastic coated fabric bag material 2 may be used. In one embodiment, a suitable plastic coated fabric bag material 2 includes a polyvinyl chloride coated polyester fabric having the description and ranges of characteristics set forth in Table 1 (FIG. 12) and Table 2 (FIG. 13). The bag material 2 of the body portion 28 includes a plurality of waterproof welded seams 4 that define a predetermined shape 27 of the body portion 28 and an opening 29 in the body portion. The body portion 28 and its shape in a filled condition (FIG. 5A and FIG. 10) defining an interior space 40 or volume within the body portion. Because of the flexibility of the bag material 2, the predetermined shape 27 will generally be defined by the predetermined payload 16 enclosed within the interior space 40, and may be a regular shape, such as a rectangular box, or an irregular shape. The predetermined shape 27 and interior space 40 are configured to receive, enclose, and store a predetermined payload 16 and may be designed so as to conform closely to the features of the predetermined payload 16. In one embodiment, the predetermined shape 27 may also be determined in accordance with a size and shape of the application environment, such as to conform to the size and shape of a truck bed, as described herein. In this case, the predetermined shape 27 and interior space may be designed to substantially fit and fill, including in certain embodiments to exactly fit and fill, the shape and size of the application environment. In other embodiments, the predetermined shape 27 may also be determined in accordance with a size and shape of the application environment, such as to exceed the size and shape of a truck bed, as described herein. In this case, the predetermined shape 27 and interior space may be designed to be larger than the shape and size of the application environment. An oversize bag configuration is particularly advantageous because even when the predetermined payload 16 completely fills the space and size of the application environment, it is still possible to operate the closure mechanism 48, such as zipper 53, to close the bag 1 easily, and avoid the introduction of a lateral tensile stress across the longitudinal axis of the closure mechanism.

Figure 5B:
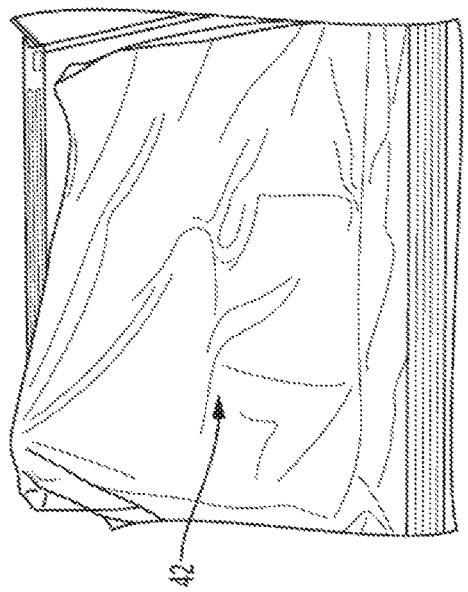
FIGS. 5A-5C are perspective views of the embodiment of the outdoor storage bag illustrated in FIGS. 1-4B showing the bag supported in a completely expanded and closed state within the truck bed with the payload.
Figure 5C:
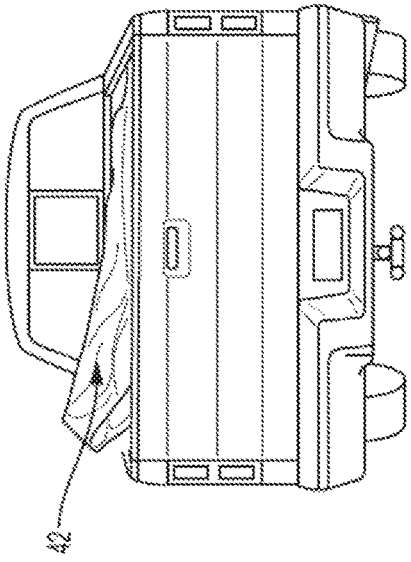
Figure 5A:
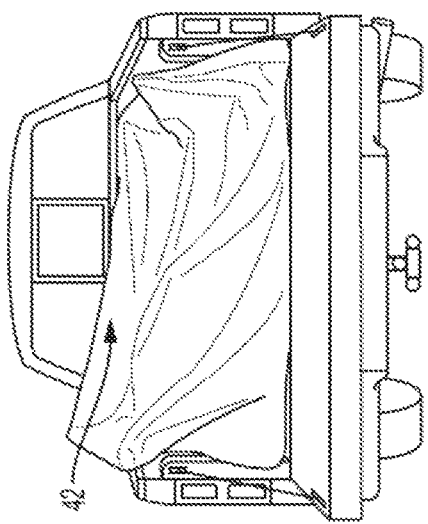
Figure 15A:
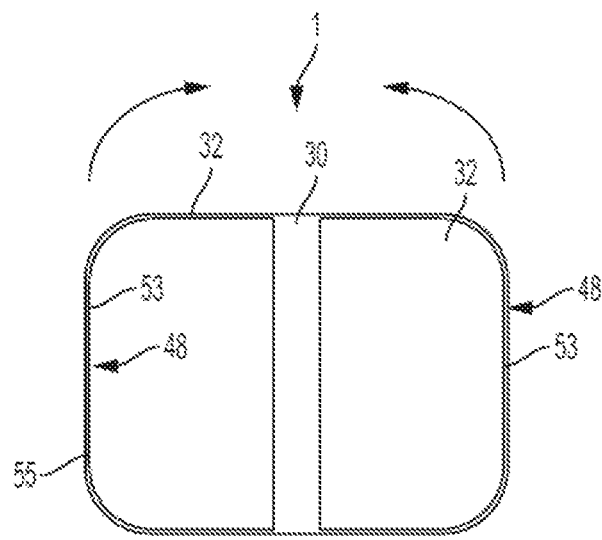
FIG. 15A is a top view of another embodiment of the outdoor storage bag of the invention.
Figure 15B:
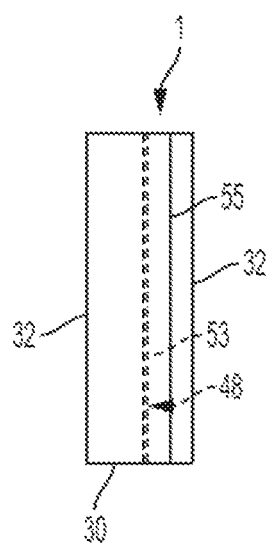
FIG. 15 B is a side view of the embodiment of the invention of FIG. 15A.

In one embodiment, the body portion 28 may be described as including a floor section 30 and at least one side-wall section 32 that extends generally upwardly from the floor section and defines the opening 29 (e.g. FIG. 4A-5C). In this embodiment, the opening 29 may include a top opening or a sidewall opening. In one embodiment, this configuration may be described generally as having a clamshell shape or configuration, and may not require a cover, as described herein (FIGS. 15A and 15B). In other embodiments, the body portion 28 may be described as including a floor section 30 and a plurality of wall sections 32 that extends generally upwardly from the floor section and defines the opening 29 (FIGS. 5A-5C). In these embodiments, the outdoor bag 1 and body portion 28 may have any suitable predetermined shape, including a generally rectangular or box shape configuration, and may employ a cover or cover portion 42, as described herein.

In this embodiment, the outdoor storage bag 1 also includes a closure mechanism 48 joined to the body portion by a welded seam 49 proximate a periphery of the opening 29. The closure mechanism 48 is configured to selectively open and close the opening 29 by action of a human user and provide a seal 51 that is at least water-resistant when the opening is closed by the closure mechanism. In one embodiment, the closure mechanism 48 comprises a zipper 53, and the zipper is at least water resistant when closed. Water-resistant zippers 53 generally have the interlocking zipper teeth attached to a fabric strip, wherein the fabric strip comprises a material and weave that resists water penetration, but may or may not have been treated with a water impervious coating material. As used herein, water-resistant means resisting though not entirely preventing the penetration of water. As used herein, waterproof or watertight means impervious to water, including permeation by water when the zipper is exposed directly to water, including being submerged to a depth that is less than a predetermined submerged depth. In one embodiment, the zipper 53 comprises a waterproof zipper. Waterproof zippers 53 generally have sealably interlocking zipper teeth attached to a strip of a plastic coated fabric material, which may include the plastic coated fabric materials described herein, including PVC coated polyester fabric. In one embodiment the zipper 53 is a double-toggle zipper and is configured to provide opposing zippers that are configured to open and close the opening from either or both of the respective ends of the zipper.

In this embodiment, the outdoor storage bag 1 also includes a flap 55 of the plastic coated fabric bag material that extends from the body portion 28 proximate the opening 29 and is positioned on body portion so that it extends laterally over and covers the closure mechanism 48. The flap also extends longitudinally along the length of the closure mechanism, thereby protecting the closure mechanism from direct exposure to the environment.

In this embodiment, the outdoor storage bag 1 further includes a plurality of anchor points 35 attached to an exterior surface 37 of the body portion 28 (FIG. 11). The anchor points 35 are configured to attach the outdoor bag 1 and body portion 28 to another object, and more particularly to the object comprising the vehicular or non-vehicular application. Any suitable anchor points 35 may be attached to the outer surface 37 of the body portion 28. As illustrated in FIG. 11, in one embodiment, each of the plurality of anchor points 35 comprises a loop 41 formed from a strip or strap 43 of a strong, tear-resistant material, such as, for example, ballistic nylon webbing. The strip or strap, having two end portions 45, the end portions inserted through a slot 47 in a patch 57 of the bag material and sewn to a back surface of the patch, and wherein the back surface of the patch is attached by a peripheral welded seam 59 to an outer surface 37 of the body portion 28 to define the anchor point 35. The welded seam 59 may be formed by any suitable welding process, including those described herein, such as RF welding. The end portions 45 may be sewn to the back surface of the patch 57 by any suitable method and pattern of stitching, including sewing in accordance with appropriate Mil Spec sewing standards for attachment of ballistic nylon webbing to other materials.

In this embodiment, the outdoor storage bag 1 includes a body portion 28 that is waterproof and the seal 51 that is at least water-resistant, making the overall outdoor storage bag 1 at least water-resistant. In certain embodiments wherein the seal 51 of the closure mechanism 48 is waterproof, such as a waterproof zipper, the overall outdoor storage bag 1 is waterproof.

In this embodiment, the outdoor storage bag 1 may further include a cover or cover portion 42 of the plastic coated fabric bag material 2, wherein the cover is configured to cover the opening 29, and wherein the closure mechanism 48 is joined on one side by the welded seam to the body portion 28 and on an opposite side by a welded seam to the cover 42. This is the configuration of the outdoor storage bag 1 of FIGS. 1-5C described below, for example. In embodiments that include a cover 42, the cover may also include at least one anchor point 35 attached to an exterior surface 61 of the cover in the manner described herein for attachment points attached to the body portion 28, as shown in FIGS. 6-8, for example.

In another embodiment of the outdoor storage bag 1, the storage bag has a rectangular box shape configuration that is well-suited to a number of application environments, particularly as a truck-bed bag 10. Referring now to FIGS. 1-5C, the truck bed 12 defines a generally planar, rectangular floor 18 of the truck bed 12. A pair of opposed side walls 20 of the truck bed 12 extend fixedly upward from respective sides of the bed floor 18. A tailgate 22 rotates hingedly from a rear end of the floor 18, where it is attached by a hinge, upward to close the truck bed 12 (and, thereby, form a rear wall of the truck bed) and downward to open the truck bed 12 (and, thereby, facilitate access to the truck bed 12). A rear face 24 of a back of a cab 26 and or a front wall 15 of the bed of the truck 14, generally indicated at 26, forms a front wall 15 of the truck bed 12. There is no roof or top to the truck bed 12 such that the truck bed 12 forms, when the truck bed 12 is closed, an open-top five-sided rectangular cube that defines a volume of space enclosed by the truck bed 12.

It will be readily appreciated by those having ordinary skill in the related art that the truck 14, in general, and truck bed 12, in particular, play no part of the invention. It should be so appreciated also that the truck bed 12, in general, and each of the floor 18, side walls 20, tailgate 22, and rear face 24 of the back of the cab 26 or front wall 15, in particular, can have any suitable shape, size, and structure and relationship with a remainder of the truck 14, including the cab 26. It will also be appreciated that the space enclosed by the truck bed 12 can define any suitable shape, size, or volume of this vehicle application environment. It should be so appreciated also that the truck bed 12 can include a roof or top.

Referring now to FIGS. 2-5C, the truck-bed bag 10 includes a substantially larger body portion, generally indicated at 28, made of flexible, waterproof bag material 2. The body portion 28 is configured to be folded and provided with an interior welded seam 4 at a plurality of locations, including in this embodiment at least four locations, to form corners 6 to define a substantially rectangular box or cubical shape of the body portion 28 defining a substantially "U-shaped" transverse cross-section and a top opening of the body portion 28. The body portion 28 is supported within the truck bed 12 and defines a floor section 30, two side-wall sections 32, two end-wall sections 34, two top-side edges 36, two top-end edges 38, and interior space 40 of the body portion 28 configured to, in combination with each other, receive, enclose, and support the payload 16.

A substantially smaller cover portion, generally indicated at 42, is made of flexible, baggy material. The cover portion 42 defines two bottom-side edges 44 and two bottom-end edges 46 of the cover portion 42. A bottom-end edge 46 of the cover portion 42 is configured to be rotatingly or pivotally attached to an end-wall section 34 of the body portion 28 at a corresponding top-end edge 38 of the body portion 28. The cover portion 42 is rotated or pivoted upon the interior space 40 of the body portion 28 such that the bottom-side edges 44 and other bottom-end edge 46 of the cover portion 42 are in contacting relationship with the corresponding top-side edges 36 and top-end edge 46 of the body portion 28 to cover the top opening 29 of the body portion 28.

A closure mechanism, generally indicated at 48, is connected to the body and cover portions 28, 42 and configured to secure covering of the top opening 29 by the cover portion 42 and, in turn, closure of the truck-bed bag 10.

Each of the body and cover portions 28, 42 can have any suitable shape, size, and structure and relationship with a remainder of the truck-bed bag 10. Each of the body and cover portions 28, 42 can be made of any suitable flexible, waterproof, plastic coated fabric bag material 2. The bottom-end edge 46 of the cover portion 42 can be rotatingly or pivotally attached at the corresponding top-end edge 38 of the body portion 28 in any suitable manner, such as by a welded seam.

In non-limiting exemplary embodiments of the bag 10, the bag 10 includes at least one solar panel 50 to act as a source of electrical power. Those having ordinary skill in the related art should readily appreciate that the bag 10 can include any suitable number of solar panels 50 each of which can have any suitable shape, size, structure, and relationship with a remainder of the bag 10.

As shown in FIG. 11, the truck-bed bag 10 also includes a plurality of anchoring points 35 that each include an anchoring component 52. The anchoring points 35 each also include a patch 57 which in one embodiment is made of a multi-ply (e.g. three-ply) PVC coated polyester fabric or Kevlar® mesh. Any suitable number of anchor points 35 may be incorporated, and in one embodiment four such anchor points are incorporated. The anchor points 35 may include any suitable anchoring components 52, and in one embodiment, the anchoring component 52 includes a loop 41 of a strip or strap 43 that is attached to the patch 57, as described herein Each ply of the patch 57 is attached to the bag 10 and has about a 300-pound holding strength. In an aspect, each ply is welded to the bag 10. In an edition of this aspect, each ply is heat-welded to the bag 10. In a version of this edition, each ply is ultrasonic/radio-frequency (RF) welded to the bag 10. Suitable anchoring components 52 may also include grommets and other attachment devices of various sizes and shapes.

The bag 10 can include any suitable number of anchor points 35, and each anchor point 35 may include any suitable number of anchor components 52, each of which can have any suitable shape, size, structure, and relationship with a remainder of the bag 10. Each anchoring component 52 can be made of any suitable number of plies, in any suitable manner, and by any suitable material. Each ply can be attached to the bag 10 in any suitable manner.

It should be readily appreciated by those having ordinary skill in the related art that the bag 10 and anchor points 35 may be anchored to the application object (e.g. vehicle or fixed emplacement) in any suitable manner and using any suitable attachment device 63, such as a tightenable strap 58, rope, chain, bungee cord, or other attachment device. The bag 10 may include any suitable number of attachment devices 63, each of which can have any suitable shape, size, structure, and relationship with a remainder of the truck-bed bag 10 and the truck bed 12. The bag 10 can include any suitable load-tightening strap 58 having any suitable shape, size, structure, and relationship with a remainder of the bag 10.

Furthermore, the outdoor storage bag 1, including truck-bed bag 10, does not include metal components that can rust, scratch, or damage the truck bed 12 or paint of the truck bed 12. In addition, the bag 10 does not include gluing, sewing, or stitching. Moreover, the bag 10 is low-temperature- and high-temperature-resistant. In an aspect, the bag 10 has a "freeze/crack" rating of about −40° F. and a "melt" rating of up to about 150° F. Plus, the bag 10 is highly ultraviolet (UV)-resistant (i.e., no fading of the bag after prolonged exposure thereof to UV radiation).

In a non-limiting exemplary embodiment, the closure mechanism 48 is a zipper assembly 53 that is at least water-resistant, and in an embodiment waterproof (i.e., has water-tight redundancy). A position of zippers of the zipper assembly 53 allows for full access to the bag 10. The zipper assembly 53 is suited to protect, for example, documents and electronic instruments against, chemicals, gas, and salt water. Toward this end, the zipper assembly 48 is made from high-strength fabric coated with thermoplastic polyurethane. The zipper assembly 48 is also highly resistant to abrasion, salt water, and damage caused by dirt and sand and has high vertical strength. Sealing edges of the zipper assembly 53 are tightly sealed together when the zipper assembly 53 is closed forming seal 51.

The closure mechanism 48 can be any suitable type of closure mechanism 48. Closure mechanism 48, including zipper assembly 53, may be positioned on outdoor storage bag, including truck-bed bag 10, in any suitable position or location. In certain embodiments, the closure mechanism 48 will located on an upper portion of the body portion 28, including locations proximate the opening 29, as well as locations 0.5 to 2.0 inches below the opening 29. The zipper assembly 53 may be configured to protect any suitable payload 16. It should be so appreciated also that the zipper assembly 53 can be made from any suitable material in any suitable manner. It should be so appreciated also that the sealing edges of the zipper assembly 53 can be sealed together in any suitable manner when the zipper assembly 53 is closed.

In one embodiment, the outdoor storage bag 1, including truck-bed bag 10, may optionally include an integrated skid plate 62 (FIGS. 7 and 8) as well for protecting (i.e., reducing wear of) a bottom of the bag 10. The skid plate 62 may have any suitable shape, size, structure, and relationship with a remainder of the bag and be made of any suitable material, and in one embodiment may include an engineering plastic, such as various thermoset or thermoplastic polymer materials, including plastic materials that include a reinforcing filler, including particle, fiber or fabric fillers. In another embodiment, the skid plate 62 may also be formed from a composite material.

The truck-bed bag 10 provides protection of the payload 16 from the elements, dust, dirt, sand, soot, smoke salt spray and physical damage, and may also provide for ease of use and manufacture of the bag. Also, the truck-bed bag 10 is highly water-resistant or waterproof. In certain embodiments, the truck-bed bag 10 can be customized to capture individual branding requirements as described herein. Furthermore, the truck-bed bag 10 is heavy-duty. In addition, in certain embodiments, the bag 10 may be made of matte-embossed PVC on an exterior surface. In one embodiment, the bag 10 is made of PVC coated woven polyester, which may encompass any of the materials and weights shown in Table 1 and 2, including 10-40 oz material, and more particularly 14-22 oz material, and more particularly 18-22 oz material. In addition, the bag 10 has a high tensile and adhesion strength as described in Tables 1 and 2. The bag 10 includes seams that are strong and heat-welded [i.e., ultrasonic/radio-frequency (RF) welded] as well.

The bag 10 is highly abrasion- and rot-resistant and tear- and puncture-resistant. Also, the bag 10 includes a zipper assembly 53 that is waterproof (i.e., has water-tight redundancy) and a position of zippers of which allows for full access to the bag 10. The bag 10 has a high thread count (i.e., about 1000×1300). Furthermore, the bag 10 is highly hydrostatic-resistant. In addition, the bag 10 is low-temperature- and high-temperature-resistant (i.e., has a "freeze/crack" rating of about −40° F. and a "melt" rating of up to about 150° F.). Moreover, the bag 10 is highly ultraviolet (UV)-resistant (i.e., no fading of the bag 10 after prolonged exposure thereof to UV radiation). The bag 10 is also flame-resistant.

The bag 10 may optionally include a one-step emergency patch kit 90. The kit may include a closable pocket 76 that includes an additional sheet or sheets of the bag material 2 that can be quickly applied by a heat weld using a heating device, such as an iron or the like.

In one embodiment, the outdoor storage bag 1, including the truck-bed bag 10, includes at least one attached partition 70 disposed within the interior space 40 as shown in FIGS. 6-8. The partition may be formed from any suitable material, and in one embodiment comprises the plastic coated fabric bag material 2 and is attached by at least one welded seam or a selectively detachable attachment, such as mating Velcro strips to an interior surface of the body portion 28. In another embodiment, the outdoor storage bag 1, including truck-bed bag 10, includes at least one unattached partition 72 disposed within the interior space that is not attached to an interior surface of the body portion 28, but which may be attached to or engaged with attached partition 70.

In one embodiment, the outdoor storage bag 1, including the truck-bed bag 10, includes at least one open (no closure) pocket 74 or selectively openable and closable pocket 76 that is attached by at least one welded seam to an interior surface or an exterior surface of the body portion as shown in FIGS. 6-8. The pocket or pockets 74, 76 may be disposed on the body portion 28 or cover 42 in any suitable location and may have any suitable size or shape. In one embodiment, the closable pocket 76 incorporates a selectively openable and closable pocket zipper 78.

In one embodiment, the outdoor storage bag 1, including the truck-bed bag 10, includes a liner 80 that is configured for selectively detachable attachment to an interior surface of the body portion 28 and/or cover 42 as shown in FIGS. 6-8. The liner 80 may be disposed on all or any portion of body portion 28 and/or cover 42 and provide a pad to cushion or protect the payload 16. The liner 80 may be formed from any suitable material. In one embodiment, the material may include imitation or natural fleece, or a woven or non-woven fabric, such as microfiber.

The invention has been described above in an illustrative manner. Those having ordinary skill in the related art will readily appreciate that the terminology that has been used above is intended to be in the nature of words of description rather than of limitation. Many modifications and variations of the 10 are possible in light of the above teachings. Therefore, within the scope of the appended claims, the invention may be practiced other than as so described.

What is claimed is:

1. A selectively openable and closable, outdoor storage bag that is at least water-resistant, comprising:
   a waterproof body portion made of a flexible, waterproof, polyvinyl chloride (PVC) coated fabric bag material, the bag material comprising a plurality of waterproof welded seams that define a shape of the body portion and an opening, the body portion defining an interior space within the body portion, the shape and interior space configured to receive, enclose, and store a payload;
   a closure mechanism joined to the body portion by a welded seam proximate a periphery of the opening, the closure mechanism configured to selectively open and close the opening and provide a seal that is at least water-resistant when the opening is closed;

a flap of the waterproof PVC coated fabric bag material that extends from the body portion and covers the closure mechanism; and a plurality of anchor points comprising a waterproof PVC coated fabric patch having an inner surface disposed toward the body portion and a loop of a tear-resistant material attached to an inner surface of the patch, the tear-resistant material having a tear-resistance at least equivalent to ballistic nylon, the inner surface of the patch attached by a welded seam to an exterior surface of the body portion, wherein the body portion of the bag is waterproof and the seal is at least water-resistant.

2. The outdoor storage bag of claim 1, further comprising a cover of the PVC coated fabric bag material, the cover configured to cover the opening, wherein the closure mechanism is joined on one side by the welded seam to the body portion and on an opposite side by a welded seam to the cover.

3. The outdoor storage bag of claim 2, wherein the cover has at least one anchor point attached to an exterior surface thereof.

4. The outdoor storage bag of claim 1, wherein the body portion comprises a floor section and at least one side-wall section that extends upwardly from the floor section and defines the opening.

5. The outdoor storage bag of claim 4, wherein the opening is a top opening or a sidewall opening.

6. The outdoor storage bag of claim 1, wherein the PVC coated fabric bag material comprises PVC coated polyester fabric bag material, and wherein each of the welded seams comprises an RF weld.

7. The outdoor storage bag of claim 1, wherein the closure mechanism comprises a zipper and the zipper is at least water resistant when closed.

8. The outdoor storage bag of claim 7, wherein the zipper is a waterproof zipper.

9. The outdoor storage bag of claim 7, wherein the zipper is a double-toggle zipper comprising opposing zippers that are configured to open and close the opening from either or both of the respective ends of the zipper.

10. The outdoor storage bag of claim 1, wherein the outdoor storage bag comprises a vehicular outdoor storage bag.

11. The outdoor storage bag of claim 10, wherein the vehicular outdoor storage bag comprises a cartop bag configured for placement on and attachment to the top of a vehicle, a truck bed bag configured for placement on and attachment to the bed of a truck, an SUV or minivan rear compartment bag configured for insertion in and/or attachment to the rear compartment of an SUV or minivan, a trailer bag configured for placement on and attachment to a towable trailer, a bicycle carrier bag configured for attachment to a vehicle bicycle carrier, a motorcycle bag configured to enclose a motorcycle, a hitch rack bag configured to enclose the payload disposed on a vehicle hitch rack, or a marine vehicle or boat bag configured for placement on and attachment to a marine vehicle or boat vehicular application.

12. The outdoor storage bag of claim 10, wherein the vehicular outdoor storage bag comprises a cartop bag configured for placement on and attachment to the top of a vehicle, a truck bed bag configured for placement on and attachment to the bed of a truck, an SUV or minivan rear compartment bag configured for insertion in and/or attachment to the rear compartment of an SUV or minivan, a trailer bag configured for placement on and attachment to a towable trailer, a bicycle carrier bag configured for attachment to a vehicle bicycle carrier, a motorcycle bag configured to enclose a motorcycle, a hitch rack bag configured to enclose the payload disposed on a vehicle hitch rack, or a marine vehicle or boat bag configured for placement on and attachment to a marine vehicle or boat vehicular application, and wherein the interior space is greater than a space required to receive, enclose and store the payload.

13. The outdoor storage bag of claim 1, wherein the outdoor storage bag comprises a deck bag configured for placement on and/or attachment to a deck of a building, patio bag configured for placement on and/or attachment to a patio of a building, tailgating bag configured for placement in a parking lot near a vehicle, or a campsite bag configured for placement in a campsite of a campground or park.

14. A selectively openable and closable, outdoor storage bag that is at least water-resistant, comprising:
   a waterproof body portion made of a flexible, waterproof, polyvinyl chloride (PVC) coated fabric bag material, the bag material comprising a plurality of waterproof welded seams that define a shape of the body portion and an opening, the body portion defining an interior space within the body portion, the shape and interior space configured to receive, enclose, and store a payload;
   a closure mechanism joined to the body portion by a welded seam proximate a periphery of the opening, the closure mechanism configured to selectively open and close the opening and provide a seal that is at least water-resistant when the opening is closed;
   a flap of the waterproof PVC coated fabric bag material that extends from the body portion and covers the closure mechanism; and
   a plurality of waterproof anchor points comprising a waterproof PVC coated fabric patch having an inner surface disposed toward the body portion and a loop of a tear-resistant material attached to an inner surface of the patch, each loop comprising a strip or strap of the tear-resistant material having two end portions that are attached to the inner surface of the respective patch, and the loops extend outwardly from the body through respective slots formed in the respective patches.

15. A selectively openable and closable, outdoor storage bag that is at least water-resistant, comprising:
   a waterproof body portion made of a flexible, waterproof, polyvinyl chloride (PVC) coated fabric bag material, the bag material comprising a plurality of waterproof welded seams that define a shape of the body portion and an opening, the body portion defining an interior space within the body portion, the shape and interior space configured to receive, enclose, and store a payload;
   a closure mechanism joined to the body portion by a welded seam proximate a periphery of the opening, the closure mechanism configured to selectively open and close the opening and provide a seal that is at least water-resistant when the opening is closed:
   a flap of the waterproof PVC coated fabric bag material that extends from the body portion and covers the closure mechanism; and
   a plurality of waterproof anchor points comprising a waterproof PVC coated fabric patch having an inner surface disposed toward the body portion and a loop of a tear-resistant material attached to an inner surface of the patch, each loop comprising nylon webbing having two end portions, the end portions inserted through a slot in a central portion of the patch and sewn to the inner surface, the inner surface of the patch attached by a peripheral welded seam to an exterior surface of the body portion to define the anchor point, wherein the body portion of the bag is waterproof and the seal is at least water-resistant.

16. The outdoor storage bag of claim 1, wherein the bag comprises at least one partition disposed within the interior space, and wherein the partition comprises the PVC coated fabric bag material and is attached by at least one welded seam or a selectively detachable attachment to an interior surface of the body portion.

17. The outdoor storage bag of claim 1, wherein the bag comprises at least one partition disposed within the interior space that is not attached to an interior surface of the body portion.

18. The outdoor storage bag of claim 1, further comprising at least one open or closable pocket that is attached by at least one welded seam to an interior surface or an exterior surface of the body portion.

19. The outdoor storage bag of claim 1, wherein the at least one pocket comprises a closable pocket and incorporates a selectively openable and closable pocket zipper.

20. The outdoor storage bag of claim 1, further comprising a liner that is configured for selectively detachable attachment to an interior surface of the body portion.

* * * * *